Patented June 17, 1947

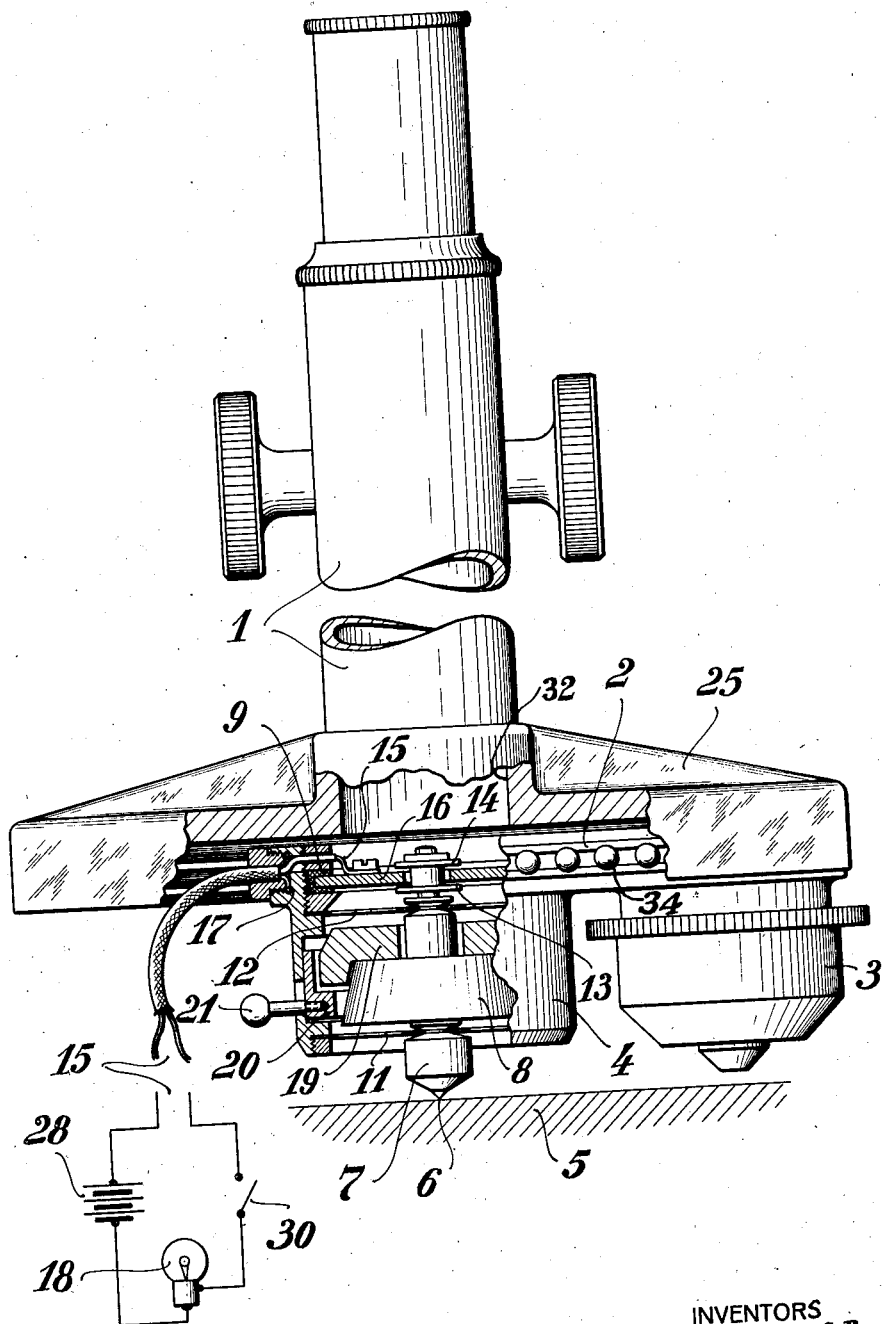

2,422,634

UNITED STATES PATENT OFFICE 2,422,634

MICROHARDNESS TESTING INSTRUMENT

Hermann Riepert and Heinrich Broschke, Wetzlar, Germany; vested in the Attorney General of the United States Application March 10, 1939, Serial No. 260,905
In Germany April 26, 1938

Sections 3 and 14, Public Law 690, August 8, 1946.
Patent expires April 26, 1958

1 Claim.  (Cl. 265—12)

This invention relates to improvements in portable hardness testing instruments. The object of the invention is to provide a relatively small compact testing mechanism which shall be especially well adapted to be used in combination with a microscope as an integral part thereof. The testing mechanism is characterized, among other features, by the fact that the testing or penetrating member is so supported that it operates under its own weight during the testing operation.

Some prior hardness testing devices or machines operate with two weights. When the testing member contacts the object a first smaller weight is placed upon or caused to operate upon the testing member to effect a first penetration into the object. Thereafter a heavier weight is used for the same purpose. The difference in penetration is then measured by suitable well known means.

Devices which operate in this manner must be constructed very substantially. They are relatively heavy and expensive. They cannot be used for testing heavy or immovable objects because the testing device itself is not portable as this term is understood. It has therefore been proposed to use smaller hardness testing devices of the portable type. With such a device the operation is carried out by placing the device upon the object and the weight of the entire device itself is utilized as a first weight to cause penetration of the object. Thereafter a weight is caused to fall upon the penetrating member in order to obtain a second deeper penetration. The difference in penetration is measured by well known means. The German Patent 572,671, March 20, 1933 refers to these types of devices.

Other devices are spring actuated and suffer from inexactness due to uneven uncontrollable tension of the spring. Still other devices utilize weights placed upon levers or arms, and it has been found that they are not sufficiently accurate.

In the present invention the hardness testing instrument or device is constructed so as to be incorporated in a microscope and carried about and used as conveniently as such instruments are customarily used. The penetrating testing element is supported in such a manner that when the microscope is placed upon an object to be tested, the testing element automatically comes to rest upon the object under its own weight. The engagement of the testing element with the object is utilized to open an electric circuit with means to signal that the element is supported by gravity and that the operation may begin. Thereafter the penetrating of the object is done by the testing element under its own weight.

Should it happen that the testing element by contacting the object is raised too high so as not to be able to function under its own weight, the circuit is again closed and signals this condition. An additional hand weight member may be provided to increase momentarily the weight of the testing element. The invention is illustrated in the accompanying drawing which is a general view of the instrument with parts broken away and parts in section. Only so much of the microscope is shown as is necessary for understanding the invention.

In the drawing the microscope is identified by the usual microscope tube 1. To the bottom thereof there is secured a bracket 25 having a central bore 32 in alinement with the microscope tube 1. The bracket 25 also supports ball bearing means 34 for the support of a sliding member 2 which supports the microscope objective 3 and the hardness testing device 4. Preferably the arrangement is such that either the objective or the testing device may be moved in under the microscope tube. In the one case to conveniently support the testing device centrally of the apparatus as shown, in the other case to align the tube and the objective. It is not necessary for practising the invention that this particular arrangement be used. It will be observed however that by combining the hardness testing device with the microscope it is an easy matter to observe the results of the testing by means of the microscope by merely sliding the objective in under the tube. It will also be clear that inasmuch as the tube is adjusted in the usual manner in microscopes it is not possible to use falling weights or like means upon the testing device, nor weights to such an extent as will disturb the tube adjustment.

Referring to the drawing the testing device comprises the general casing 4 which is supported in the slide 2. The casing supports a plate 16 which is insulated as at 9. The plate supports the testing element 7 which is in the form of a vertical shaft. Above the plate 16 this shaft carries a contact disk 14. Below the plate the shaft carries another contact disk 13. The distance between the disks is somewhat greater than the thickness of the plate 16. The testing element carries at its lower end a suitable testing penetrating point 6 and above the latter the testing element is enlarged to form a weight 8. The testing element is guided vertically by two thin lamellae 11 and 12. These are of sufficient strength to guide the element 7 against tipping but they are not strong enough to interfere with the free vertical movement of the element. An additional loose weight 19 is provided to rest upon the weight 8 when necessary. The weight 19 may be lifted off the weight 8 by a ring 20 provided with a handle 21 accessible from the outside of the casing 4.

The plate 16 is connected by a wire 15 to a source of electric current 28 and a lamp 18. The return wire of the circuit may be grounded as at 17. The numeral 5 indicates the object 30 is a switch.

When the operator intends to use the instrument he moves the member 2 in its supporting ball bearing 34 to bring the testing element into alinement with the tube 1, this being the most convenient position as shown in the drawing, closes the switch 30 and places the instrument upon the object 5. The circuit remains closed so long as the disk 14 rests upon the plate 16. However, when the testing point 6 touches the object, the testing element 7 is lifted and the circuit is broken at 14—15, the lamp goes out and thus signals the beginning of the testing operation. Should the circumstances be such that the element 7 is lifted too high, then the circuit is again closed by engagement of the lower disk 13 with the plate 16. The lamp then is lit again and thus signals to the operator to adjust the instrument. Normally however, when the apparatus has been placed upon the object, the circuit will be broken as aforesaid and now the testing element 7 will rest upon the object under its own weight to cause the necessary penetration of the point 6. If no additional weight is necessary, the operator lifts the weight 19 of the weight 8, and vice versa. Thereafter the objective is moved in under the microscope tube for examination of the penetration point or area of the object.

From the foregoing it will be noted that the testing element is normally supported by gravity and is automatically lifted out of its thus supported position and brought to rest by gravity upon the object either under its own normal weight or with the loose weight added. The electric signal means serve to notify the operator that the testing element is in proper operative position for the test. The device is small, compact, easily portable and conveniently incorporated into the microscope structure.

It will further be clear that the operation of the testing element or the position thereof need not necessarily be signalled in the manner disclosed. It is within the scope of the invention to provide supporting means for the testing element so arranged that the operator may observe the element directly. Such an alternative embodiment is not shown.

We claim:

In a microhardness testing instrument as described, a microscope having a microscope tube, an objective and a testing device including a testing element, a bracket upon the lower end of said tube having a centrally extending vertical bore in alinement with said tube, horizontally disposed guiding means in said bracket at the bottom of and intersecting said bore, a slidable member supported in said guiding means, means for supporting said testing device and said objective upon said slidable member for horizontal slidable movement to selectively bring the testing device or the objective into vertical alinement with the microscope tube, said testing device supporting means including means for supporting the testing element in a normal gravity actuated non-testing position from which said testing element is automatically moved upon being brought into contact under its own weight with an object to be tested and which said element automatically reassumes upon removal from the object, means for increasing the weight of the element during the testing operation and electrically operated signalling means actuated by said element to indicate its respective said positions.

HERMANN RIEPERT.
HEINRICH BROSCHKE.

REFERENCES CITED

The following references are of record in the file of this patent:

UNITED STATES PATENTS

| Number | Name | Date |
|---|---|---|
| 1,885,972 | Wilson | Nov. 1, 1932 |
| 1,478,621 | Smith et al. | Dec. 25, 1923 |
| 2,138,411 | Tornebohm | Nov. 29, 1938 |
| 1,512,192 | Benko | Oct. 21, 1924 |
| 1,985,916 | Coates et al. | Jan. 1, 1935 |
| 1,452,810 | Moore et al. | Apr. 24, 1923 |
| 2,003,910 | Stephenson | June 4, 1935 |
| 1,875,134 | Phund | Aug. 30, 1932 |
| 1,846,043 | Desautels | Feb. 23, 1932 |

FOREIGN PATENTS

| Number | Country | Date |
|---|---|---|
| 467,806 | Great Britain | June 23, 1937 |
| 464,005 | Great Britain | Apr. 9, 1937 |
| 195,094 | Germany | Feb. 6, 1908 |